United States Patent [19]

Kirtley et al.

[11] Patent Number: 4,849,735

[45] Date of Patent: Jul. 18, 1989

[54] RADIO CONTROLLED SAFETY STOP SYSTEM FOR FORKLIFT TRUCKS

[75] Inventors: James M. Kirtley, 839 Columbia Ave., Salinas, Calif. 93901; Kevin S. Lamb, Salinas, Calif.

[73] Assignee: James M. Kirtley, Salinas, Calif.

[21] Appl. No.: 57,380

[22] Filed: Jun. 2, 1987

[51] Int. Cl.[4] .......................... G08G 1/00; H04B 7/26

[52] U.S. Cl. .................................... 340/539; 340/901; 49/14; 180/271

[58] Field of Search ............... 340/539, 901, 904, 988, 340/52 H, 61; 180/271; 49/13, 14

[56] References Cited

U.S. PATENT DOCUMENTS

| | | | |
|---|---|---|---|
| 2,025,106 | 12/1935 | Hirshfeld | 340/901 |
| 4,013,994 | 3/1977 | Ragano et al. | 340/539 |
| 4,115,757 | 9/1978 | Blahunka | 340/539 |
| 4,217,588 | 8/1980 | Freeny | 340/988 |
| 4,621,252 | 11/1986 | Johns et al. | 340/61 |

*Primary Examiner*—John Chapman
*Attorney, Agent, or Firm*—John J. Leavitt

[57] ABSTRACT

Presented is a radio controlled safety stop system for forklift trucks including a transmitter mounted above a doorway in a warehouse or other building in such a way that a radio signal is continuously transmitted by the transmitter when the door is closed in a pattern such that the signal strength of the radio signal at a predetermined far distance from the door is detectably weaker than the radio signal that is detectable at a predetermined near distance from the door. Mounted on the forklift truck and provided with an appropriate antenna to detect the signals being transmitted, is a radio receiver which detects the radio signal when the forklift truck moves into the far distance zone included by the relatively weak radio signal, and which then functions to activate an alarm to warn the driver that he is approaching a danger zone. If the driver disregards the alarm and proceeds closer to the point of danger, say to the predetermined near distance limit at which the radio signal is more intense, the radio receiver on the forklift truck detects this second level of radio signal strength and responds by disabling the ignition system of the forklift truck.

6 Claims, 4 Drawing Sheets

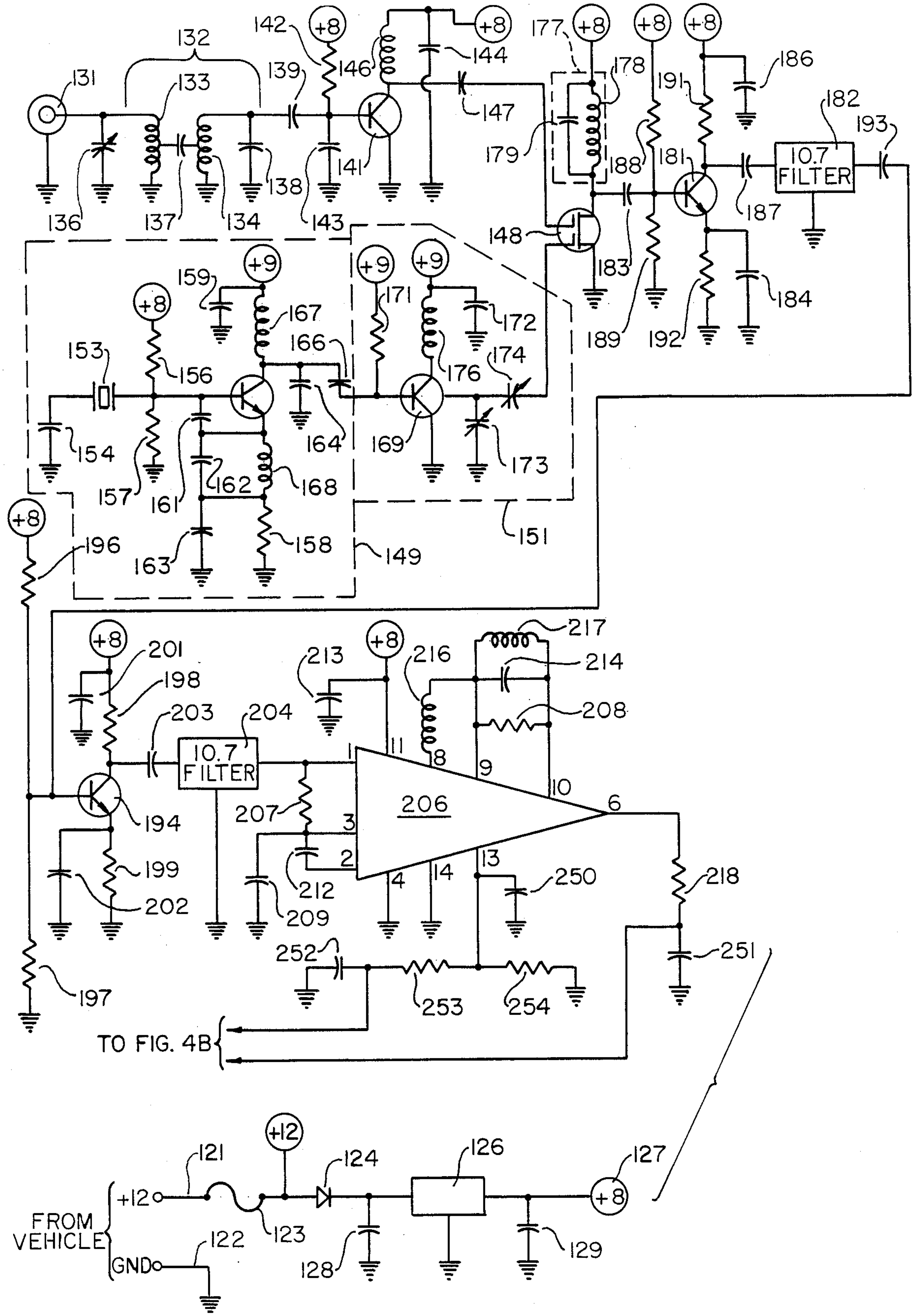
F/G. 4A

RADIO CONTROLLED SAFETY STOP SYSTEM FOR FORKLIFT TRUCKS

BACKGROUND OF THE INVENTION

1. Field of the Invention.

This invention relates to safety systems, and more particularly to a safety system applicable to a forklift truck to prevent the forklift truck from inadvertently running through a closed door, such as the door of a loading bay in a warehouse.

2. Description of the prior Art.

A search of the prior art related to this invention has been made, and has revealed the existence of U.S. Pat. Nos. as follows:

| | | |
|---|---|---|
| 4,079,802 | 2,804,160 | 3,683,379 |
| 3,898,652 | 4,528,563 | 3,892,483 |
| 3,976,151 | 4,278,962 | 4,136,329 |
| | 3,882,95 | |

Referring to each of the patents in the order in which they were issued, U.S. Pat. No. 2,804,160 is directed to the concept of controlling a trailing vehicle so that it does not rear-end a vehicle in front of it. It accomplishes this purpose by transmitting a radio signal that is reflected from the leading vehicle and is received by the trailing vehicle. The received signal initiates actuation of the brakes or the ignition system of the trailing vehicle so as to prevent a collision.

U.S. Pat. No. 3,683,379 accomplishes the same purpose as U.S. Pat. No. 2,804,160, but it does so in a different way and with a different circuitry. In this patent, one of the head lamps of the vehicle is used as both the transmitter (filament) and the receiver (reflector) of the reflected wave of radio frequency energy that is reflected from the leading car. The signal so received is then used to actuate an alarm to warn the driver, or to actuate a brake operating solenoid to effect deceleration of the vehicle as required.

U.S. Pat. No. 3,882,957 teaches the concept of a "tilt" switch for use with automobiles so that the ignition and fuel supply are shut off it the vehicle tilts beyond a certain degree. Obviously, this patent has no significant relevance with regard to preventing a forklift truck from running into a closed door.

U.S. Pat. No. 3,892,483 teaches the concept of transmitting a signal both forwardly and backwardly so as to alert motorists in front and behind the vehicle transmitting the signal of their proximity in relation to the vehicle transmitting the signal. Remedial action is initiated by the vehicle, in front or in back, which receives the signal. One of the difficulties encountered with this disclosure is that it presumes that all vehicles in a line of vehicles are similarly equipped, and that there will be interaction between the signals transmitted by the vehicles, i.e., the forwardly transmitted signal of a trailing vehicle will interact with the rearwardly transmitted signal of a leading vehicle. Obviously, such a state of affairs could not be mandated unless required by law.

This patent also discloses the concept of a radio signal transmitted rearwardly, the signal varying in intensity (reduced) at increasing distances from the rear of the vehicle. Conceptually, when a trailing vehicle, having an appropriate receiver, enters the radiation area or zone created by the transmitter on the leading vehicle, the receiver on the trailing vehicle initiates a controlling function, i.e., actuates a buzzer, a light or actuates application of the brakes, or interruption of the ignition system.

U.S. Pat. No. 3,898,652 provides an even more elaborate system than the one immediately preceding in that it discloses the use of side sensors in addition to the use of front and rear sensors. The sensors sense the location of surrounding vehicles, and channel this information into a signal processing unit. The velocity of the vehicle is also sensed, and fed into the processor, which then calculates whether the vehicle can stop in time to avoid running into any other vehicles. The output of the processor may be applied to the vehicle brake and accelerator controls for slowing down a vehicle if the operator does not respond promptly to a warning signal.

U.S. Pat. No. 3,976,151 teaches a system for enabling a golf cart to follow you around the golf course. A small transmitter carried by the golfer transmits a radio frequency signal that is coupled magnetically with a directional antenna on the cart. The cart also carries guidance devices to control the power applied to the wheels so as to make the cart follow the golfer in response to the direction from which the signal emanates.

U.S. Pat. No. 4,079,802 discloses circuitry for controlling the distance between two vehicles traveling at varying velocities. It accomplishes this purpose by sensing the velocity of the trailing vehicle, sensing the velocity of the leading vehicle, determining the difference in their velocities, and then uses this differential to determine what type of control to apply to the trailing vehicle to maintain a predetermined minimum space between the vehicles. It is interesting to note that the circuitry will not only decelerate the trailing vehicle when necessary, but will also accelerate it to maintain the predetermined spacing between the vehicles.

U.S. Pat. No. 4,136,329 relates to the control of the engine of a large truck, such as a large diesel engine. The device monitors certain parameters that must fall within a predetermined range. If the parameters fall outside that range, the control device first warns of the danger, then initiates action to shut down the engine if the driver does not respond. The driver is provided with means for overriding the system when necessary of advisable.

U.S. Pat. No. 4,278,962, U.S. Pat. No. discloses an automatic alarm system for detecting obstacles, such as walls or doors, behind a vehicle that is proceeding in reverse. Structurally, a transmitter and a receiver are mounted on a rotating disk contained within a housing mounted on the vehicle. An aperture in the housing permits transmission of a supersonic signal which is reflected from any obstructions and re-enters the hole, or aperture, to be picked up by the receiver. The received signal initiates an alarm, warning the driver that he is approaching an obstacle.

Lastly, U.S. Pat. No. 4,528,563 teaches a concept that utilizes sound and the frequency of an intermittent sound to alert a driver that he is approaching an obstruction. he sound emanates from different areas, left front, left rear, right front, or right rear, to alert the driver of the direction of the obstruction. This device is said to be particularly adapted to warn the driver when he is backing his vehicle, such as when backing into a garage where his visibility is limited.

We have found that many manufacturing plants and warehouses utilize vast square footage areas to perform their various functions, and that delivery of supplies and the shipping of materials from these plants is frequently by truck or railroad car. To facilitate receiving and shipping goods from these plants, it is the practice to provide shipping and receiving ramps that are elevated above grade level so as to approximate the height of the bed of a truck backed up to the ramp. Alternatively, where railroad cars are used to receive and ship goods at these plants, the ramp is usually spaced from the open door of the railroad car by approximately 3 or 4 feet, and a heavy steel plate or apron is extended between the building ramp and the railroad car to fill the gap and permit the transfer or reception of goods between the railroad car and the plant. In most of these instances, reception of goods and supplies by the plant, or shipment of manufactured goos from the plant or warehouse, is done through large openings in various walls of the plant building that provide an unobstructed opening through which forklift trucks may move. Thus, forklift trucks, under the control of an operator, move back and forth through the opening between the bed of a flat bed truck backed up to the loading ramp, or into the boxcar from which goods are being off-loaded, or into which goods are being loaded for shipment.

It is the custom in industry to utilize large roll-up doors for closing and opening the doorways through which products move. These roll-up doors are frequently articulated steel doors, rolled up by an appropriate motor energized by a worker when the need arises to open or close the door. One of the problems that has plagued industry is that forklift truck operators, for whatever reason, frequently run into these doors with their forklift trucks when the doors are in a closed position. Accordingly, one of the important objects of this invention is the provision of a system that will prevent a forklift operator from driving his forklift truck into a closed door.

The incidence of damage to plant and warehouse doors by the ramming of such doors with a forklift truck has become almost endemic. Several overhead door companies maintain several crews busy repairing such damage. At today's labor and material costs, the repair of such doors can frequently amount to several times the cost of a device such as the one forming the subject matter of this invention for preventing the damage. But the damage to the door cannot be measured only in terms of time and material to effect the repair. Additionally, the doorway in which a damaged door is mounted is out of service for whatever length of time it requires a door repair company to effect the repairs. Sometimes this can be many days, even weeks, while vital parts that are not readily available locally are ordered from the factory and received and installed. Sometimes, the factory sends the wrong part, even though it was properly ordered, thus prolonging the time that the doorway is out of order and unuseable by the plant or warehouse. If the door that has been damaged happens to be the only door into or out of the premise for goods being received or shipped, it sometimes becomes necessary to disassemble the entire door assembly and leave it disassembled until either a new door or a repaired door can be installed, with the interval being covered from a security standpoint by the hiring of special security personnel. Again, the cost inherent in the repair of the door far outweighs the cost of a safety device to prevent the damage in the first place.

Accordingly, another important object of the invention is the provision of a radio controlled safety stop system for forklift trucks that will alert the driver that he is approaching a danger zone when the forklift truck is a predetermined distance from the door, and which automatically interrupts the ignition system of the forklift truck to thereby stop the forklift truck if the forklift truck operator ignores the warning system and continues moving in the direction of danger.

While emphasis has been placed above on the need for a safety device for forklift trucks to prevent the forklift truck from ramming and thereby damaging a closed roll-up overhead door, it is of equal importance that a forklift truck be precluded from driving through an open door under conditions which are unsafe, such as when a truck or a railroad car is not parked adjacent to the platform, thus causing the forklift truck, with its load and operator to drive off the loading platform, with attendant damage to the forklift truck, its cargo and injury to the driver. Accordingly, a still further object of the present invention is the provision of a radio control safety stop system for forklift trucks that will operate to stop a forklift truck from passing through even an open doorway when unsafe conditions prevail.

Forklift trucks that are used in the industrial arena are frequently very heavy vehicles. Some of these forklift trucks weigh as much as 4 and 5 thousand pounds. It is believed that forklift trucks designed for use within a building such as a warehouse or manufacturing plant are geared to travel at perhaps no more than 5 miles per hour. Obviously, there are some exceptions. However, even at 5 miles per hour, a heavily loaded forklift truck can impose a terribly destructive force if it impacts an obstacle, such as a closed door. Since it appears to be impractical to initially stop the forklift truck when it comes within a predetermined distance of the doorway, it is one of the objects of this invention to initially sound an alarm so that the operator of the forklift truck may himself take remedial action to stop the forklift truck.

It is another object of the invention to only secondarily take control of the forklift truck out of the hands of the human operator and to interrupt the ignition system of the forklift truck when the forklift truck is within a predetermined proximity to the door.

The invention possesses other objects and features of advantage, some of which, with the foregoing will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the radio control safety stop system for forklift trucks forming the subject matter of this invention comprises a transmitter mounted above a doorway in such a way that a radio signal is continuously transmitted by the transmitter in a pattern such that the signal strength of the radio signal at a predetermined far distance from the door is detectably weaker than the radio signal that is detected at a predetermined near distance from the door. Mounted on the forklift truck and provided with an appropriate antenna to detect the signals being transmitted, is a radio receiver which detects the radio signal when the forklift truck moves into the far distance zone included by the relatively weak radio signal, and which then functions to actuate an alarm to warn the driver that the is approaching a danger zone. If the driver disregards the alarm and proceeds closer to the point of danger, say to the predetermined near distance limit at which the radio signal is more intense, the radio receiver on the forklift truck detects this second level of radio signal strength and responds by actuating means which disables the ignition system of the forklift truck, thus causing the forklift truck to stop within a very short distance and certainly before it reaches the closed door, or the open doorway. We have found that for most installations, a far distance limit set at fifteen feet provides sufficient time for the operator, if he is alert and aware of the danger, to take remedial action to stop the forklift truck. Additionally, we have found that if the forklift truck proceeds to within about 4 feet from the closed door or open doorway, interrupting the electrical ignition system at this point gives adequate opportunity to stop the forklift truck before it rams the closed door or passes through the open doorway. Since it frequently is necessary for the forklift truck to intentionally pass through an open doorway, means are providing for disabling the transmitter when safe conditions prevail at the doorway. In another aspect of the invention, it may be necessary for different reasons to maintain an overhead door open during regular business hours even if no truck or railroad car is present adjacent the loading platform. Under these circumstances, means are provided to activate the radio control safety stop system for forklift trucks so that a forklift truck driver, being preoccupied with other matters, will not drive through an open doorway and off of the elevated loading ramp.

BRIEF DESCRIPTION OF THE DRAWINGS

FIG. 4(A) is a schematic view of a portion of the receiver circuitry.

DESCRIPTION OF THE PREFERRED EMBODIMENT

Figure 1:
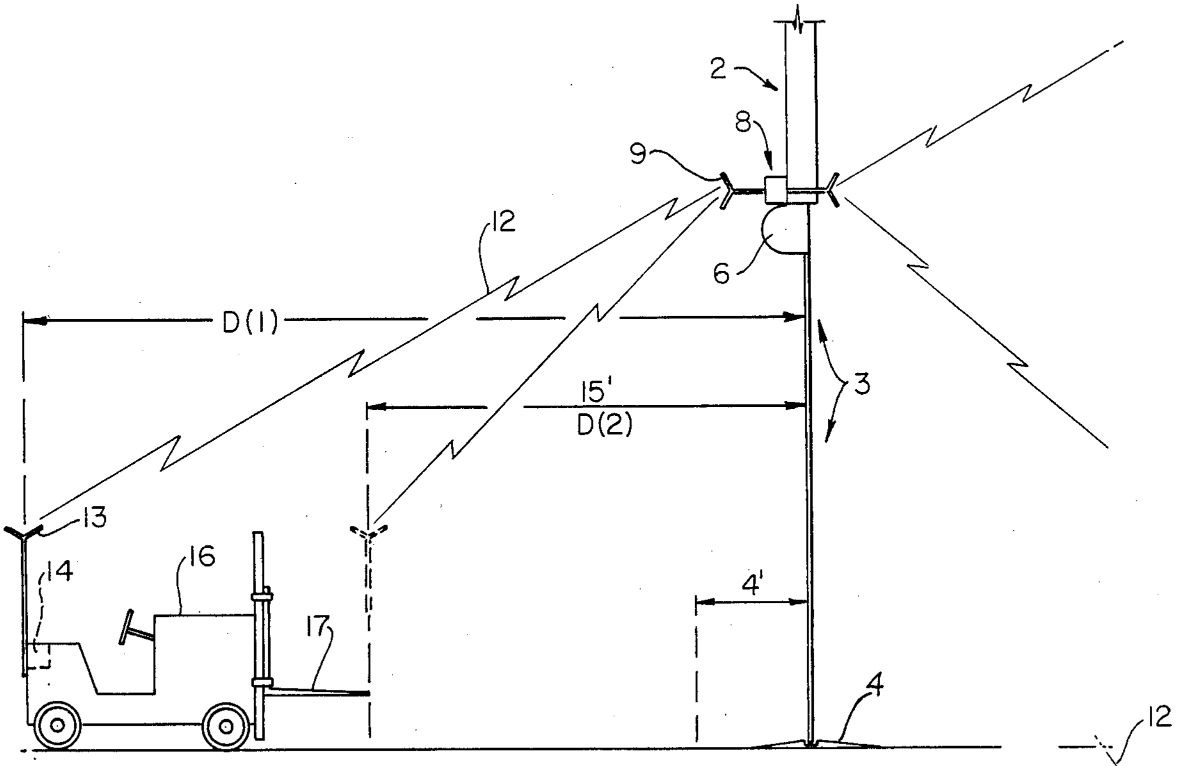
FIG. 1 is a pictorial view illustrating the environment and relationship of the invention in its position of use.

Referring to FIG. 1, it will there be seen that the radio controlled safety stop system for forklift trucks forming the subject matter of this invention is utilized in an area, such as a warehouse or manufacturing plant in which a wall 2 is provided with a roll-up type door assembly designated generally by the numeral 3 and which includes a floor plate 4 and a roll-up mechanism 6 adapted to be activated in the conventional manner either manually by a chain working over a sprocket to effect roll-up of the door 7, or through use of an electric motor drive connected to the sprocket or to an appropriate gear drive whereby the door 7 is rolled upwardly into an open position, or rolled downwardly into a closed position by selective energization of the electric motor. These controls are conventional and are therefore not illustrated in the drawing in the interest of brevity in this description. Suffice to say that the door 7 is provided with means for de-energizing the electric motor when the door has reached either its extreme open position or its extreme closed position. Such means for de-energizing the electric motor may be a switch of the type that is actuated by proximity to a magnetic which is supported on the door to bring it into proximity with the switch, or it may constitute a lever that is abutted by an appropriate projection on the door, or it may be any of a number of other devices that may be used to interrupt power to the electric motor.

Mounted on the wall 2 above the door, preferably medianly placed thereabove between the two side edges of the doorway, is a transmitter designated generally by the numeral 8, having a transmitting antenna 9 projecting therefrom and adapted to transmit a very short range 360 degree radio signal 12 that forms a radio signal "envelope" on the interior and exterior of the building wall 2. The radio signal "envelope" must therefore be penetrated in order to reach the door 7. The radio signal 12 is such that a pre-determined far distance D(1) from the door 7, the signal strength is relatively weak (level A) in comparison with the signal strength (level B) at pre-determined near distance D(2) from the door. Stated another way, as the "envelope" formed by the radio signal is penetrated in a direction from the far distance limit at which it is first detected toward the door meant to be protected, the signal strength increases from a weak level A signal to a significantly stronger level B signal. The difference in strength of the radio signal between level A and level B is sufficient to be detected, as will hereinafter be explained.

As illustrated in FIG. 1, the installation of the transmitter and the strength of the radio signal 12 is "tailored" or "customized to be detected and received by an antenna 13 appropriately connected to a receiver 14 mounted on the forklift truck 16. Preferably, the radio signal 12 is adapted to be first detected by the receiving antenna 13 at far distance D(1) when the tips of the tines or forks 17 of the fork lift truck are approximately 15 feet away from the door. Obviously, because forklift trucks differ in their size, elevation and speed of travel, and because antennas must be mounted on such forklift trucks in different locations, these dimensions may be varied to "customize" the system to a particular customer. Since, with the present system, it is desirable that the ends of the forks of the forklift truck come no closer than about 4 feet from the door, it will be seen from FIG. 1 that the antenna 13 will have been transposed to the near distance postion D(2) illustrated in broken lines when the ends of the tines or forks 17 have reached the position where the forklift truck will be stopped to prevent it from damaging the door.

In the preferred embodiment, the door is equipped with an appropriate magnet which comes into close proximity to a reedtype switch (ON or OFF) responsive to the magnetic field of the magnet when the door is in open position. When the door is in open position, the transmitter 8 is turned OFF by closing of the reed switch by the magnetic field of the magnet. When the door is closed, the magnet is far removed from the reed switch and the switch is in its OFF position, and the transmitter is turned ON. Since this type of arrangement is conventional, and may vary with each installation because of local needs, it is omitted from the drawings in the interest of clarity. Obviously, the reverse situation may be aranged so that the transmitter is ON when the door is open.

The receiver 14 is energized whenever the ignition switch (not shown) of the forklift truck is ON to enable operation of the forklift truck. Once energized, the receiver "listens" for the coded signal from the transmitter 8, which is coded in a manner to be hereinafter explained. When the receiver "hears" the correct coded radio signal, the alarm circuitry and the ignition "kill" circuitry are "enabled" to respond when the forklift truck reaches the far distance D(1) position and the near distance D(2) position, respectively. Thus, when the forklift truck is within about fifteen feet of the door, the alarm sounds, warning the driver to take remedial action. If no remedial action is taken, and the forklift truck progresses to about four feet from the door, the ignition of the forklift truck is interrupted and the forklift truck comes to a stop before it can impact with and damage the door. Since leaving the forklift truck at the position at which the ignition was interrupted could contribute to an unsafe situation, the system is provided with a momentary over-ride switch that can be manipulated by the operator to move the forklift truck out of the restricted area.

Figure 2:
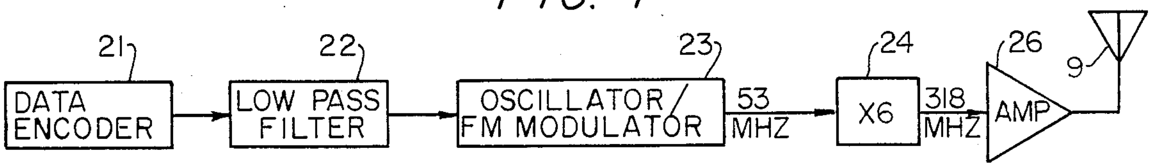
FIG. 2 is a block diagram of the transmitter assembly.

Referring to the block diagram of FIG. 2, it will be seen that the properly encoded signal is passed from the data encoder 21 through a low-pass filter 22 which conditions the signal and passes it on to the oscillator/FM modulator 23 which outputs a 53 MHz signal that is multiplied by six at 24 to direct a 318 MHz signal into the amplifier 26, and thence into the transmitter antenna 9. It will of course be understood that the transmitter is powered via a power cord plugged into a standard 120 VAC power outlet commonly found in most buildings. These elements, being conventional, are shown schematically in the drawing in the interest of clarity.

Figure 3:
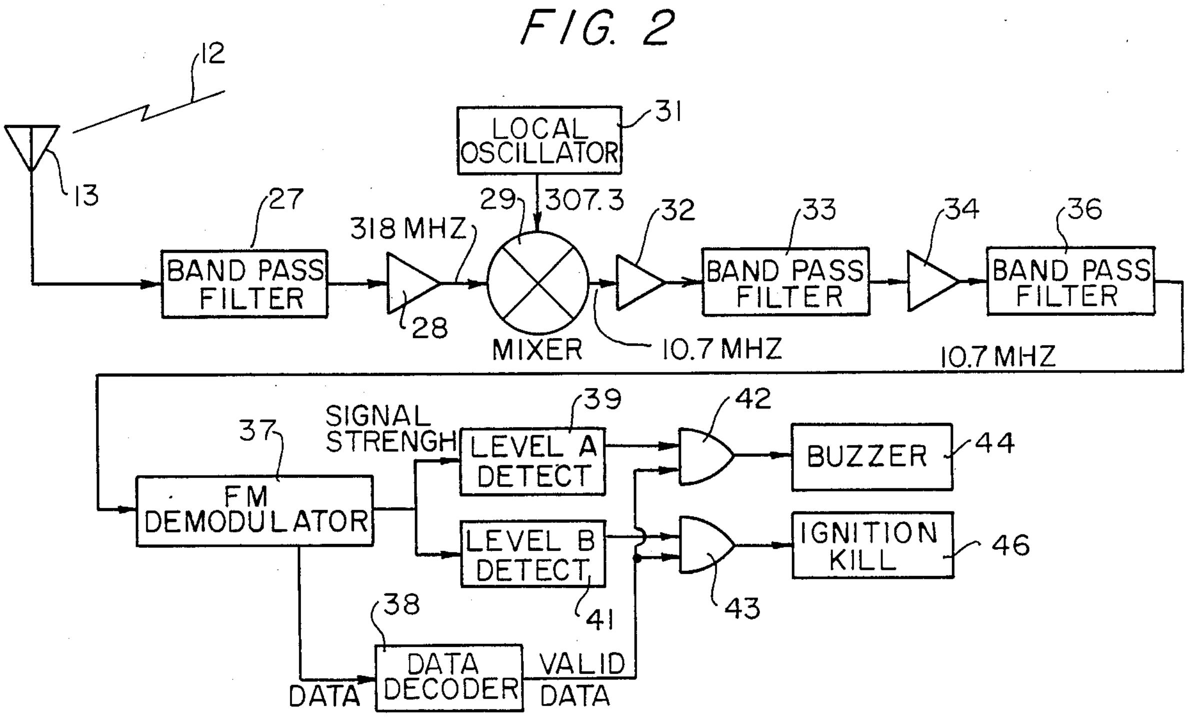
FIG. 3 is a block diagram of the receiver assembly.

Referring to the receiver circuit illustrated in block diagram form in FIG. 3, the 318 MHz encoded signal is received by the antenna 13 on the forklift truck, passes through bandpass filter 27 and tuned amplifier 28 and into the mixer 29. Local oscillator 31 feeds a 307.3 MHz signal into the mixer 29, and the differential frequency of 10.7 MHz is fed through amplifier 32, bandpass filter 33, amplifier 34, bandpass filter 36 to FM demodulator 37. From the demodulator 37, the signal is passed to a data decoder 38 on the one hand, and to a pair of signal level detector devices 39 and 41 on the other hand. Valid data is channeled to a pair of AND gates 42 and 43 from the data decoder, and level A signal strength detector 39 outputs to AND gate 42, while level B signal strength detector 41 outputs to AND gate 43, whereupon buzzer 44 is triggered to sound when the forklift truck has reached the far distance D(1) signal penetration position, and the ignition "kill" relay 46 is activated when the forklift truck has reached the near distance signal penetration limit illustrated in FIG. 1 of the drawing as D(2).

TRANSMITTER

Figure 5:
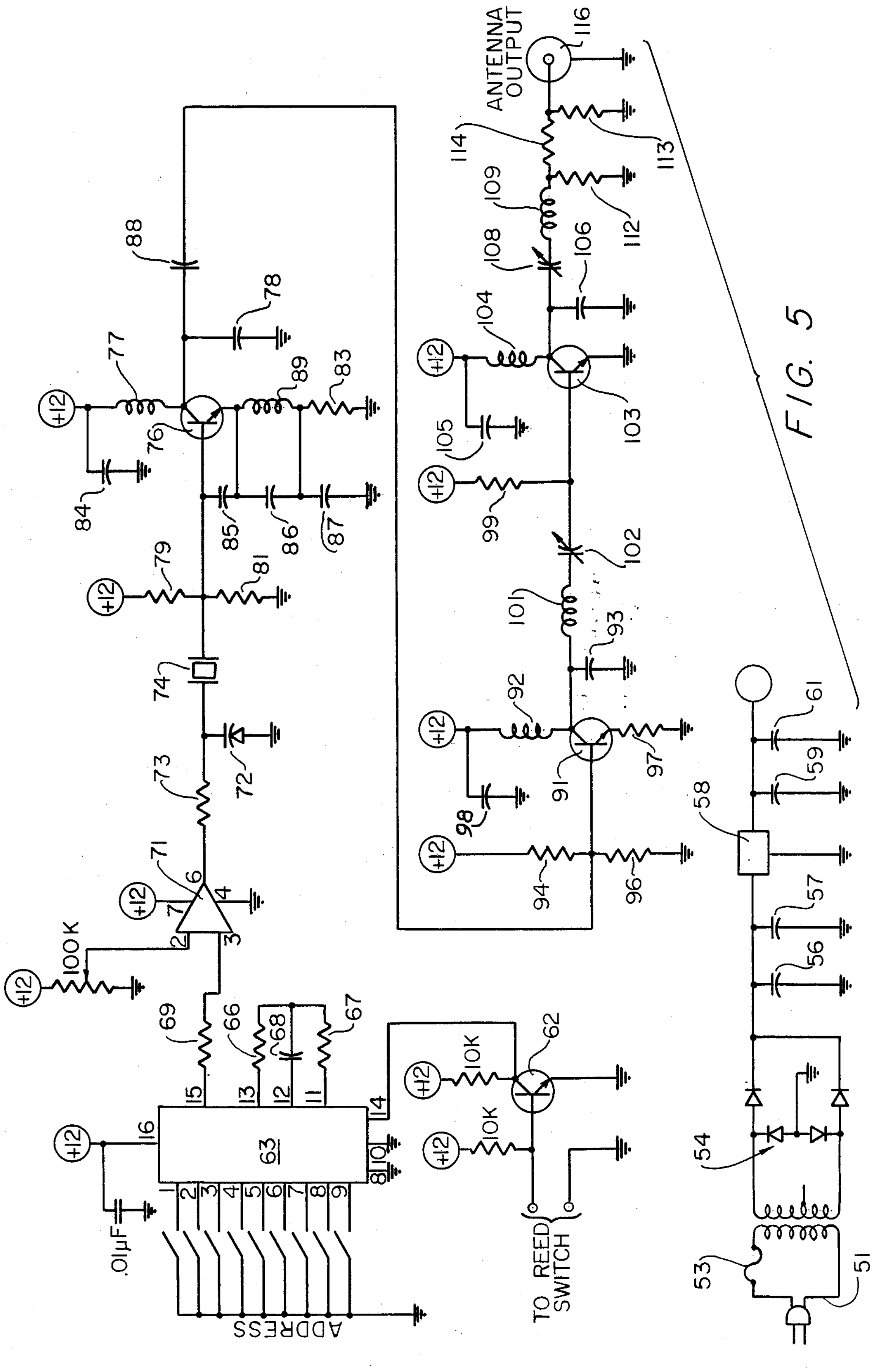
FIG. 5 is a schematic view of the transmitter circuit.

Referring with greater specificity to the transmitter circuitry illustrated schematically in FIG. 5, the transmitter is powered by power cord 51 adapted to plug into a conventional 120 VAC power outlet. As illustrated, the primary winding of center-tap transformer 52 is protected by a 0.5 amp fuse 53. The secondary winding of the transformer is connected as shown to a full wave rectifier bridge 54 of the type manufactured and sold by Motorola under the trade designation 1N4001. Capacitors 56 and 57 filter the input voltage to the regulator 48, which is conveniently of the LM7812 type manufactured by National Semiconductor. It should be noted that the LM78XX series of voltage regulators from National Semiconductor are functionally equivalent to the MC7800 series voltage regulators manufactured and sold by Motorola. As shown, the output from the voltage regulator 58 is further filtered by capacitors 59 and 61.

Mounted on or in close proximity to the transmitter 8 is a reed-type switch (not shown) which is normally open when the door 7 is closed, but which responds to an appropriate magnet (not shown) mounted on the door when the magnet is brought into close proximity to the reed switch by the act of opening the door 7 to provide a passageway through the wall 2. The effect of bringing the magnet into close proximity with the reed switch is to cause the reed switch to close. In the embodiment illustrated, as long as the reed switch is closed, as when the warehouse door is open, the NPN-type silicon RF high frequency transistor 62 is prevented from turning "on", since in this condition of the situation, the door being open, it does not require protection from damage by forklift trucks. However, when the door closes, and the magnet on the door is removed from proximity with the reed switch, then the transistor 62 turns "on", and terminal pin 14 on the encoder designated generally by the numeral 63 goes low, thus enabling the encoder to transmit a data signal, the content of which is controlled by the selective actuation of the nine input switches designated generally by the numeral 64. We have found an encoder of the type manufactured by Motorola and designated MC145026 to be satisfactory for our purpose, since it will encode nine bits of information and serially transmit this information upon receipt of a transmit enable, i.e., active low, signal. The nine inputs may be encoded with trinary data (0, 1, and open), thus allowing $3^9$ (19,683) different codes. It will thus be apparent that with this many code options, the protective system of the invention can be "tailored" or "customized" for various customers to meet their specific operational needs, e.g., the transmitted radio signal is encoded with identifiable data, and the radio receiver's data decoder decodes a stream of data received from the transmitter whereby different codes may be assigned to different forklift trucks whereby some forklift trucks are enabled to enter the restricted area while other forklift trucks are prevented from entering the restricted area.

Resistors 66 and 67, and capacitor 68 set the time base for the encoder 63. For the circuit illustrated, the data rate is approximately 420 baud, or bits per second. The output from the encoder is channelled through resistor 69 to operational amplifier 71 which functions as a buffer for the data, and additionally controls the voltage on voltage-variable capacitance diode 72, which receives the voltage through resistor 73. The voltage-variable capacitance diode 72 is of the type designated MV2201 and manufactured by Motorola. The capacitance of the diode varies with the voltage across it, from 5.4 pF to 8.1 pF, with a nominal value of 6.8 pF.

This variance of capacitance in the diode 72 causes the resonant frequency of the crystal 74 to shift slightly, allowing the data stream to frequency-modulate the oscillator 76. The crystal forms the basis for the oscillator, which is tuned to the second harmonic (106 MHz) with inductance coil 77 and capacitor 78. The values of resistors 79, 81, and 83 are tabulated below, as are the values of capacitors 84, 85, 86, 87 and 88, and the value of the inductance coil 89. From the oscillator 76, the signal is channeled to the NPN-type silicon high-frequency transistor 91 which functions as a radio frequency amplifier to multiply the signal by three to 318 MHz, cooperating in this respect with inductance coil 92 and capacitor 93. The values of resistors 94, 96, and 97, and capacitor 98 are tabulated below. From the amplifier 91, the signal then passes through a bandpass filter formed by inductance coil 101 and variable capacitor 102 before the signal reaches the final amplifier 103 which is of the same type as amplifier 91 and is tuned with inductance coil 104 and capacitor 106. From the amplifier 103, the signal is channelled through a second bandpass filter formed by variable capacitor 108 and inductance coil 109, from whence it passes through a resistive matching network made up of resistors 112, 113 and 114 to the output jack 116 of the antenna 9.

RECEIVER

Figure 4B:
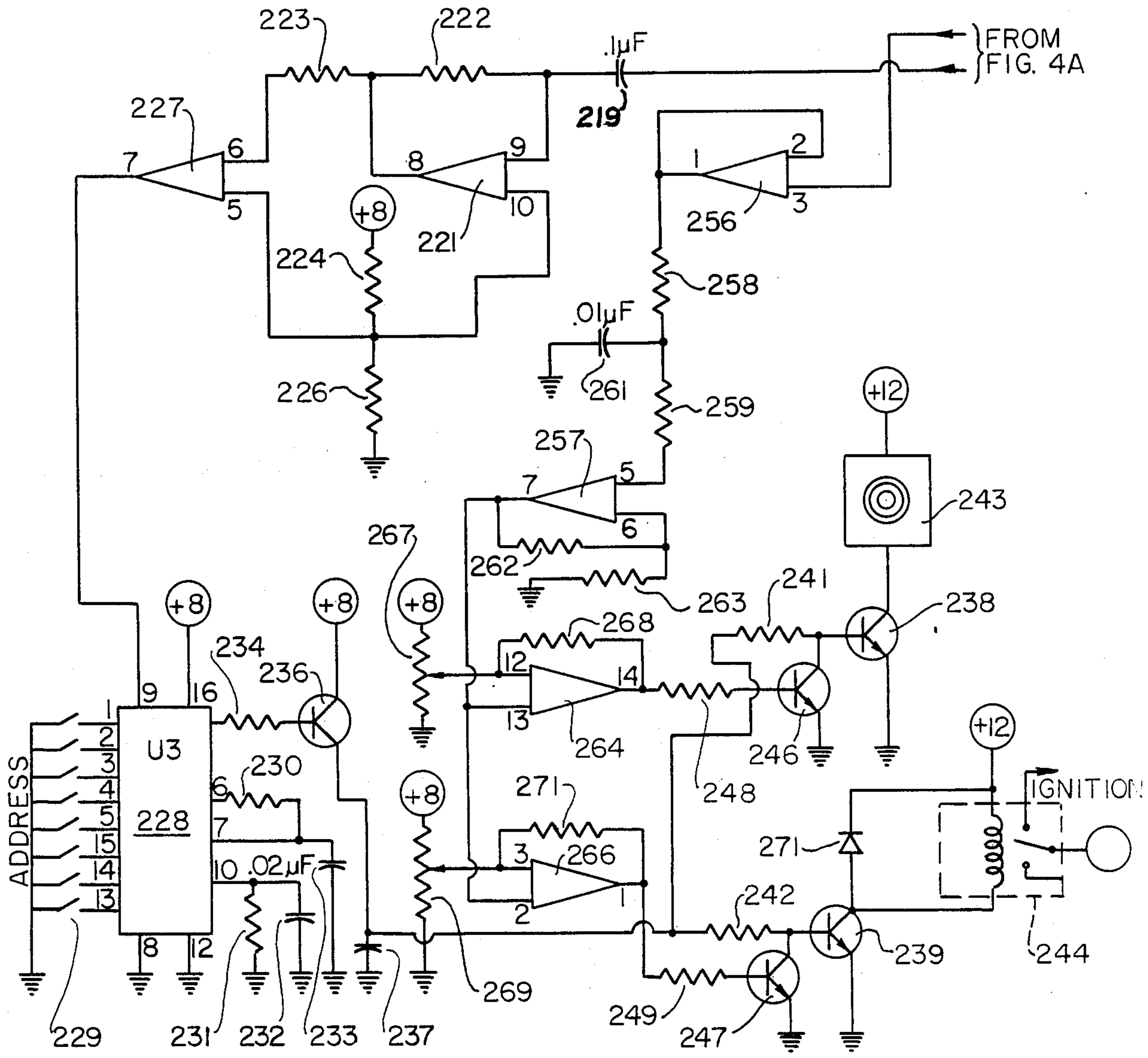
FIG. 4(B) is a continuation from 4(A) of the receiver circuitry.

Referring with greater specificity to the receiver schematic illustrated in FIGS. 4(A) and 4(B), power to the receiver is taken from the ignition of the forklift truck through leads 121 and 122, the latter being a ground lead. When the ignition is turned on to render the forklift truck operative, the power to the receiver is also turned on, rendering the receiver operative. As indicated, power enters the circuit through 0.5 amp fuse 124, diode 123, through the voltage regulator 126 to the output terminal 127. The diode 124 is a general purpose diode bearing the designation 1N4003 and manufactured by Motorola. The voltage regulator is manufactured by National Semiconductor, and carries the designation LM7808. Capacitors 128 and 129 filter the voltage before and after the regulator 126.

The encoded signal transmitted by antenna 9 of the transmitter enters the receiver through antenna 13 of the receiver and through antenna jack 131. The signal passes through a bandpass filter designated generally by the numeral 132 and formed specifically from inductance coils 133 and 134, and variable capacitor 136 and fixed capacitors 137 and 138, thence through capacitor 139 to pre-amplifier 141, which functions as a tuned amplifier in cooperation with resistor 142, capacitors 143 and 144 and inductance coil 146 to deliver the signal through capacitor 147 to the mixer 148. Pre-amplifier 141 is of the MRF 904 type manufactured by Motorola, while the mixer 148 is an RCA MOSFET designated 3N211.

The mixer 148 also receives a signal from the local oscillator designated generally by the numeral 149, and through the tuned buffer/amplifier designated generally by the numeral 151. The local oscillator 149 includes transistor amplifier 152 and related circuitry, including crystal 153 having a resonant frequency of 51.2167 MHz, variable capacitor 154, resistors 156 157 and 158, and fixed capacitors 159, 161, 162, 163, 164 and 166, and inductance coils 167 and 168. Transistor amplifier 152 is designated 2N2222 and is manufactured by Motorola. In this local oscillator circuit, inductance coil 167 resonates with capacitor 164 to amplify the third harmonic of the crystal 153 to a frequency of 153.65 MHz.

The tuned buffer/amplifier circuit 151 functions to double the local oscillator frequency of 153.65 MHz to 307.3 MHz, and feeds this doubled frequency to the mixer 148. The tuned buffer/amplifier circuit 151 includes a high frequency transistor 169 designated 2N5179 manufactured by Motorola, resistor 171, fixed capacitor 172, variable capacitors 173 and 174, and inductance coil 176.

Associated with the mixer 148 is a transformer 177 composed of inductive coil 178 and capacitor 179. The transformer 177 resonates at 10.7 MHz, which is the differential between the frequency of the signal supplied to the mixer by the pre-amplifier 141 and the local oscillator 149. The transformer 177 picks up the intermediate frequency and feeds it to transistor amplifier 181 for amplification into the ceramic filter 182. The transistor amplifier 181 works in conjunction with fixed capacitors 183, 184, 186, and 187, and resistors 188, 189, 191, and 192 as illustrated. The transistor amplifier 181 is of the 2N2222 type similar to the transistor 152 utilized in the local oscillator. From the filter 182, the signal passes through capacitor 193 to transistor amplifier 194, also of the 2N2222-type similar to transistor amplifier 181. This transistor amplifier works in conjunction with resistors 196, 197, 198 and 199, and fixed capacitors 201, 202 and 203 as shown. After passing through capacitor 203, the output signal from the transistor amplifier 194 is again filtered by ceramic filter 204 and passes to the demodulator chip 206. The demodulator chip 206 is manufactured by RCA and carries the trade designation CA3089, and constitutes a monolithic integrated circuit which uses quadrature detection to demodulate the IF signal into audio. As indicated in the drawing, the demodulator chip 206 has two outputs at pins 6 and 13, a voltage level which varies proportionally with the signal strength, at pin 13, and the demodulated audio output at pin 6. Working in conjunction with the demodulator chip 206 are resistors 207 and 208, fixed capacitors 209, 212, 213, and 214, fixed inductance coil 216 and variable inductance coil 217. The values for these components are tabulated below.

The demodulated audio output from pin 6 is fed through resistor 218, capacitor 219 into operational amplifier 221, which is one of four operational amplifiers on the integrated circuit, which converts the demodulated audio output into a data stream. Operational amplifier 221 cooperates with resistors 222, 223, 224 and 226 to feed the signal into the second operational amplifier 227 which is contained on the same integrated circuit as operational amplifier 221 and which functions to give the data stream sharper edges and re-inverts the signal to feed it to the data decoder device designated generally by the numeral 228. As illustrated, a part of the assembly of the decoder device 228 includes a switch designated generally by the numeral 229 and including a plurality of switches which are pre-set to decode the data stream, the particular decoder chip designated treating all nine bits of data received as address data. We have found that for our purpose, a decoder device manufactured by Motorola and sold under the trade designation MC145028 performs satisfactorily in the circuit. Resistors 230 and 231, and capacitors 232 and 233 set the data rate for the decoder device 228 to approximately 420 baud. Thus, if the data stream input into the decoder matches the address defined by the switch assembly 229, then the decoder device outputs a "high" voltage at pin 11. This voltage is applied through resistor 234 to the transistor amplifier 236, which becomes conductive and charges capacitor 237, and tries to turn on transistor amplifiers 238 and 239, connected in parallel, the signal to these transistor amplifiers passing through resistors 241 and 242, respectively. It will of course be apparent from the circuit, that the transistor amplifier 238 when in a conductive condition functions to sound the buzzer 243. Additionally, when the transistor amplifier 239 is in an on or conductive condition, it energizes the "kill" relay 244 to interrupt the ignition circuit of the forklift truck and cause it to stop.

Whether or not transistor amplifiers 238 and 239 turn on or become conductive is controlled by transistor amplifiers 246 and 247, respectively, working in conjunction with resistors 248 and 249. It should be noted that transistor amplifiers 238 239, 246 and 247 are all of the 2N2222-type similar to transistor amplifiers 236, 194, 181 and 152.

As indicated above, the demodulator device 206 has two outputs, one of these being from pin 13 which outputs a voltage level which varies proportionally with the signal strength. The signal output from pin 13 of demodulator 206 passes through an RC low-pass filter composed of capacitors 250 and 252, and resistors 253 and 254, before being input to one of two operational amplifiers 256 and 267 on the same integrated circuit, the operation amplifier 256 functioning as a unitygain buffer. Resistors 258 and 259, and capacitor 261 function as a second RC low-pass filter before the voltage level is amplified by operational amplifier 257. Operational amplifier 257 cooperates with resistors 262 and 263 to feed the signal in parallel to operational amplifiers 264 and 266 connected as shown, including 100K ohms potentiometer 267 cooperatively associated with resistor 268 and operational amplifier 264; and 100K ohms potentiometer 269, cooperatively related with resistor 271 associated with operational amplifier 266. Operational amplifier 264 functions as a comparator to compare the signal strength against the reference voltage set by potentiometer 267. When the signal strength, or voltage, is greater than the reference voltage, the output will go low to turn off transistor amplifier 246, enabling transistor amplifier 238 to turn on the buzzer 243, provided of course, that the decoder device 228 has received the correct data. Operational amplifier 266, on the other hand, compares the signal strength against the reference voltage set by potentiometer 269. Again, when the signal strength or voltage, is greater than the reference voltage, the output of operational amplifier 266 will go low, to turn off transistor amplifier 247, enabling transistor amplifier 239 to turn on the relay to cut the ignition if the signal strength is greater than the reference voltage, and again, if the correct data is received by the decoder device 228.

In the interest of clarity in the drawings, the values of the components utilized in the circuits have been omitted from the drawings, the components being referred to by reference numbers. There follows in tabulated form a listing of the components, indicated by reference number and indicating the nomenclature and, where appropriate, the preferred value for each:

| TRANSMITTER | | |
|---|---|---|
| Reference No. | Nomenclature | Parameter |
| 53 | Fuse | 0.5 Amp. |
| 52 | Transformer | 12.5 V CT. |
| 54 | Diode Rectifier Bridge | 1N4003 |
| 56 | Capacitor | 470 uF |
| 57 | Capacitor | 0.1 uF |
| 58 | Voltage Regulator | LM7812 |
| 59 | Capacitor | 470 uF |
| 61 | Capacitor | 0.1 uF |
| 62 | Transistor Amplifier | 2N2222 |
| 63 | Data Encoder | MC145026 |
| 64 | Switch | |
| 66 | Resistor | 10K |
| 67 | Resistor | 20K |
| 68 | Capacitor | 0.0051 uF |
| 69 | Resistor | 10K |
| 71 | Operational Amplifier | |
| 72 | Diode | MV2201 |
| 73 | Resistor | 20K |
| 74 | Crystal | |
| 76 | Transistor Amplifier | 2N2222 |
| 77 | Coil | 5.5T |
| 78 | Capacitor | 8 pF |

-continued

| TRANSMITTER | | |
|---|---|---|
| Reference No. | Nomenclature | Parameter |
| 79 | Resistor | 9.1K |
| 81 | Resistor | 620 ohms |
| 83 | Resistor | 33 ohms |
| 84 | Capacitor | 0.001 uF |
| 85 | Capacitor | 68 pF |
| 86 | Capacitor | 91 pF |
| 87 | Capacitor | 0.001 uF |
| 88 | Capacitor | 6 pF |
| 89 | Coil | 0.22 uH |
| 91 | Amplifier | MRF904 |
| 92 | Coil | 2.5T |
| 93 | Capacitor | 2 pF |
| 94 | Resistor | 9.1 K |
| 96 | Resistor | 620 ohms |
| 97 | Resistor | 33 ohms |
| 98 | Capacitor | 0.001 uF |
| 99 | Resistor | 100 K |
| 101 | Coil | 1.5T @ .15" Dia. |
| 102 | Variable Capacitor | 2-10 pF |
| 103 | Amplifier | MRF904 |
| 104 | Coil | 2.5T |
| 105 | Capacitor | 0.01 uF |
| 106 | Capacitor | 1.0 pF |
| 108 | Variable Capacitor | 2-10 pF |
| 109 | Coil | 1.5T @ .15" Dia. |
| 112 | Resistor | 100 ohms |
| 113 | Resistor | 100 ohms |
| 114 | Resistor | 75 ohms |
| 116 | Antenna jack | |

| RECEIVER | | |
|---|---|---|
| Reference | Nomenclature | Parameter |
| 121 | Input Lead | +12 V |
| 122 | Ground Lead | |
| 123 | Fuse | 0.5 Amp |
| 124 | Diode Rectifier | 1N4003 |
| 126 | Voltage Regulator | LM7808 |
| 127 | Terminal | +8 V |
| 128 | Capacitor | 100 uF |
| 129 | Capacitor | 100 uF |
| 131 | Antenna jack | |
| 132 | Bandpass Filter | |
| 133 | Coil | 2.5 T |
| 134 | Coil | 2.5 T |
| 136 | Variable Capacitor | 2-10 pF |
| 137 | Capacitor | 5 pF |
| 138 | Capacitor | 1.5 pF |
| 139 | Capacitor | 5pF |
| 141 | Amplifier | MRF904 |
| 142 | Resistor | 68K |
| 143 | Capacitor | 1 pF |
| 144 | Capacitor | 0.001 uF |
| 146 | Coil | 2.5 T |
| 147 | Capacitor | 3 pF |
| 148 | 3N211 MOSFET Amplifier | To 200 MHz |
| 149 | Local Oscillator | 153.65 MHz |
| 151 | Tuned Buffer/Amplifier | 307.3 MHz |
| 152 | Transistor Amplifier | 2N2222 |
| 153 | Crystal | |
| 154 | Variable Capacitor | 10-40 pF |
| 156 | Resistor | 9.6 K |
| 157 | Resistor | 1 K |
| 158 | Resistor | 33 ohms |
| 159 | Capacitor | 0.01 uF |
| 161 | Capacitor | 68 pF |
| 162 | Capacitor | 91 pF |
| 163 | Capacitor | 0.01 uF |
| 164 | Capacitor | 3 pF |
| 166 | Capacitor | 20 pF |
| 167 | Coil | 2.5 T |
| 168 | Coil | 0.22 uH |
| 169 | Tuned Buffer/Amplifier | 2N5179 |
| 171 | Resistor | 82 K |
| 172 | Capacitor | 0.001 uF |
| 173 | Variable Capacitor | 2-10 pF |
| 174 | Variable Capacitor | 2-10 pF |

-continued

RECEIVER

| Reference | Nomenclature | Parameter |
|---|---|---|
| 176 | Coil | 1.5 T |
| 177 | Transformer | 10.7 MHz |
| 178 | Coil | |
| 179 | Capacitor | |
| 181 | Transistor Amplifier | 2N2222 |
| 182 | Ceramic Filter | 10.7 MHz |
| 183 | Capacitor | 0.01 uF |
| 184 | Capacitor | 0.01 uF |
| 186 | Capacitor | 0.01 uF |
| 187 | Capacitor | 0.01 uF |
| 188 | Resistor | 9.1 K |
| 189 | Resistor | 910 ohms |
| 191 | Resistor | 330 ohms |
| 192 | Resistor | 10 ohms |
| 193 | Capacitor | 0.01 uF |
| 194 | Transistor Amplifier | 2N2222 |
| 196 | Resistor | 3.3 K |
| 197 | Resistor | 330 ohms |
| 198 | Resistor | 330 ohms |
| 199 | Resistor | 10 ohms |
| 202 | Capacitor | 0.01 uF |
| 203 | Capacitor | 0.01 uF |
| 204 | Ceramic Filter | 10.7 MHz |
| 206 | Demodulator Chip | CA3089 |
| 207 | Resistor | 330 ohms |
| 208 | Resistor | 8.2 K |
| 209 | Capacitor | 0.01 uF |
| 212 | Capacitor | 0.01 uF |
| 213 | Capacitor | 0.01 uF |
| 214 | Capacitor | 100 pF |
| 216 | Coil | .22 uH |
| 217 | Variable Inductor Coil | |
| 218 | Resistor | 4.7 K |
| 219 | Capacitor | 0.1 uF |
| 221 | Operational Amplifier | |
| 222 | Resistor | 100 K |
| 223 | Resistor | 4.7 K |
| 224 | Resistor | 4.7 K |
| 226 | Resistor | 4.7 K |
| 227 | Operational Amplifier | |
| 228 | Decoder | MC145028 |
| 229 | Switch | |
| 230 | Resistor | 9.1 K |
| 231 | Resistor | 200 K |
| 232 | Capacitor | 0.02 uF |
| 233 | Capacitor | 0.02 uF |
| 234 | Resistor | 1.0 K |
| 236 | Transistor Amplifier | 2N2222 |
| 237 | Capacitor | 100 uF |
| 238 | Transistor Amplifier | 2N2222 |
| 239 | Transistor Amplifier | 2N2222 |
| 241 | Resistor | 10 K |
| 242 | Resistor | 10 K |
| 243 | Alarm Buzzer | |
| 244 | Relay | |
| 246 | Transistor Amplifier | 2N2222 |
| 247 | Transistor Amplifier | 2N2222 |
| 248 | Resistor | 10 K |
| 249 | Resistor | 10 K |
| 250 | Capacitor | 0.001 uF |
| 251 | Capacitor | 0.001 uF |
| 252 | Capacitor | 0.01 uF |
| 253 | Resistor | 33 K |
| 254 | Resistor | 33 K |
| 256 | Operational Amplifier | |
| 257 | Operational Amplifier | |
| 258 | Resistor | 47 K |
| 259 | Resistor | 47 K |
| 261 | Capacitor | 0.01 uF |
| 262 | Resistor | 220 K |
| 263 | Resistor | 220 K |
| 264 | Operational Amplifier | |
| 266 | Operational Amplifier | |
| 267 | Potentiometer | 100 K |
| 268 | Resistor | 100 K |
| 269 | Potentiometer | 100 K |
| 271 | Diode | 1N914 |

Having thus described the invention, what is believed to be new and novel and sought to be protected by letters patent of the United States is as follows:

We claim:

1. In combination with a forklift truck having a motor for driving the truck and an electrical ignition system which enables operation of the truck motor when energized and interrupts operation of the truck when deenergized, a radio control system selectively operable to automatically sound an alarm to enable the operator of the forklift truck to take remedial action when the forklift truck approaches a predetermined restricted area, comprising:

(a) a radio transmitter mounted to transmit radio signals to define said restricted are within an "envelope" of radio signal;

(b) a radio receiver mounted on said forklift truck and having an antenna adapted to detect said transmitted radio signals prior to said forklift truck penetrating said "envelope" of radio signals and including means responsive to detection of said radio signal prior to penetration of said "envelope" to "enable" the sounding of an alarm;

(c) first means cooperatively related to said radio receiver and responsive to said "envelope" of radio signals after said alarm has been enabled for activating an audible alarm to warn the operator of the forklift truck when said forklift truck penetrates said "envelope" of radio signals and receives relatively weak radio signals whereby the operator of the forklift truck may take remedial action after the forklift truck has entered said restricted area; and (d) second means cooperatively related to said radio receiver and responsive to relatively strong radio signals after activation of said audible alarm for automatically disabling the electrical ignition system of the forklift truck if the operator has not taken remedial action.

2. The combination according to claim 1, in which said transmitted radio signal is encoded with identifiable data, and said radio receiver includes a data decoder arranged to decode a stream of data received from said transmitter whereby a forklift truck including a data decoder responsive to said identifiable data is prevented by said second means from farther entering said restricted area.

3. The combination according to claim 1, in which said second means includes signal level detecting means for automatically deenergizing the ignition system of the forklift truck when the forklift truck progresses a predetermined distance beyond its position when said alarm is activated.

4. The combination according to claim 1, in which said transmitter includes a data encoder for selective encoding of a multiplicity of identifiable data codes in said transmitted radio signal at a data rate of approximately 420 baud, an operational amplifier which functions as a buffer for data, a voltage-variable capacitance diode the capacitance of which varies as the voltage applied thereacross, a crystal resonant at a predetermined base frequency which is shifted slightly by the variance of capacitance in said diode, an oscillator adapted to be frequency modulated by said data to produce a signal frequency of 106 MHz, means for multiplying the signal to produce a signal having a frequency of 318 MHz, a bandpass filter for receiving and filtering the 318 MHz signal, an amplifier for receiving the filtered 318 MHz signal, a second bandpass filter for receiving and filtering the amplified 318 MHz signal, and a resistive matching network for receiving and passing the transmitted radio signal to the transmitter antenna.

5. The combination according to claim 1, in which said transmitted radio signal is encoded with identifiable data, and said receiver includes an antenna for receiving said transmitted encoded radio signal, a signal mixer, means for channelling said received signal at a frequency of 318 MHz to said signal mixer, a local oscillator adapted to generate a signal having a frequency of 307.3 MHz, means for channelling said 307.3 MHz, signal to said mixer whereby the 10.7 Mhz differential of the 318 MHz signal and the 307.3 MHz signal is output from said mixer, means for receiving and demodulating said 10.7 MHz signal, comparator means for receiving the 10.7 Mhz signal from said demodulator to determine the signal strength thereof between two different levels thereof, a data decoder adapted to receive said signal from said demodulator, and means for receiving valid data from said decoder and signal strength data from said comparator, whereby an alarm is caused to sound when valid data and a predetermined low level of signal strength are received and said ignition is interrupted when valid data and a predetermined high level of signal strength are received.

6. In combination with a forklift truck having a motor for driving the truck and an electrical ignition system which enables operation of the truck motor when energized and interrupts operation of the truck when deenergized, a radio control system selectively operable to automatically sound an alarm when the forklift truck approaches a predetermined restricted area, comprising:

(a) a radio transmitter mounted to define said restricted area within an "envelope" of radio signals;

(b) a radio receiver mounted on said forklift truck and having an antenna adapted to detect said transmitted radio signal prior to said forklift truck penetrating said "envelope" of radio signals;

(c) means in said radio receiver for detecting variations in the signal strength of said transmitted radio signal correlated to the distance relationship of said forklift truck with said restricted area defined by said "envelope" of radio signals; p1 (d) means operatively associated with said radio receiver to sound an audible alarm when said means for detecting the transmitted radio signal detects a weak signal upon penetration of said "envelope" of signals;

(e) means operatively associated with said radio receiver for interrupting the ignition system of the forklift truck when said means for detecting said transmitted radio signal detects a predetermined relatively stronger radio signal as the forklift truck penetrates farther into the "envelope" of radio signals (f) said transmitter being mounted in close proximity to a doorway and a door associated with said doorway of a building in which said forklift truck is operative and being energized to transmit a radio signal when said door is closed; and (g) said "envelope" of radio signals defining a predetermined area around said door, whereby said "envelope" of radio signals must necessarily be penetrated to reach said closed door.

* * * * *